Feb. 12, 1924.
T. PHILLIPS
OVERWINDING PREVENTER FOR SPRING MOTORS
Filed Nov. 1, 1922
1,483,744
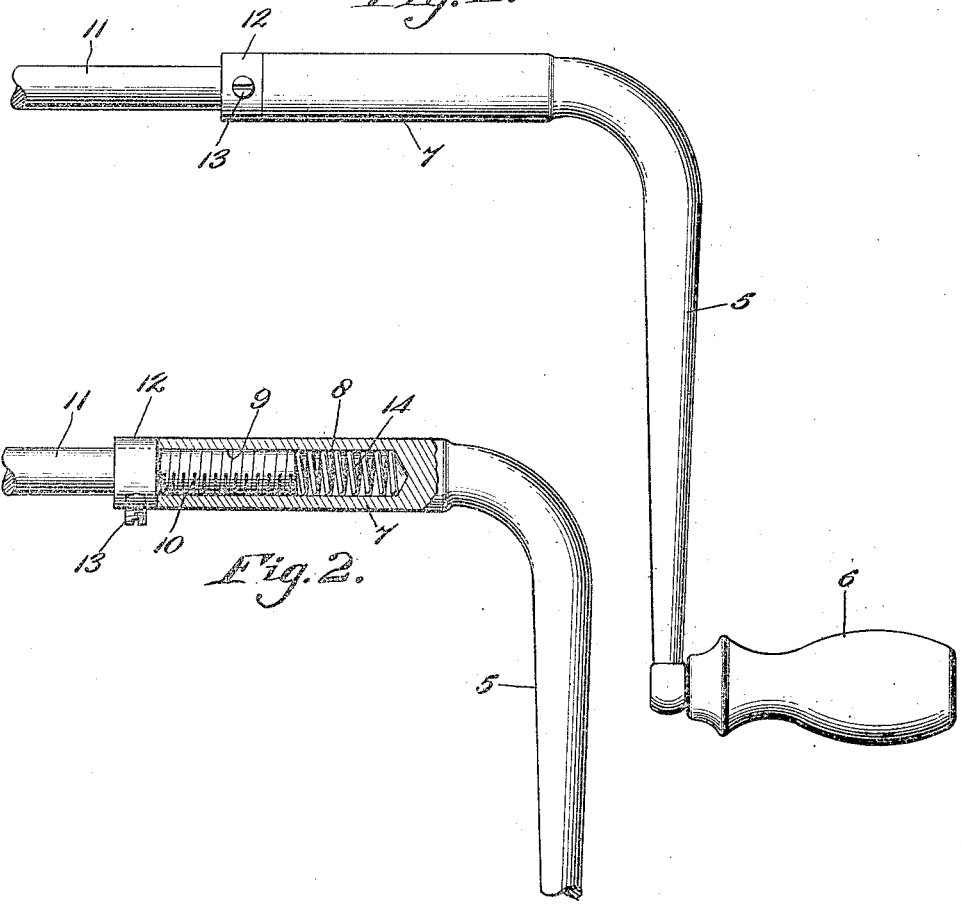
Inventor:
Theodore Phillips Patented Feb. 12, 1924.

1,483,744

UNITED STATES PATENT OFFICE.

THEODORE PHILLIPS, OF WASHINGTON, DISTRICT OF COLUMBIA.

OVERWINDING PREVENTER FOR SPRING MOTORS.

Application filed November 1, 1922. Serial No. 598,378.

*To all whom it may concern:*

Be it known that I, THEODORE PHILLIPS, a citizen of the Republic of Hungary, residing at Washington, District of Columbia, have invented new and useful Improvements in Overwinding Preventers for Spring Motors, of which the following is a specification.

This invention relates to a mechanism for preventing the overwinding of spring motors, and has for one of its objects to provide means in the form of a peculiarly constructed crank especially adapted for use with the spring motors of phonographs, although not restricted to motors of this particular type.

In phonographs and other similar sound reproducing mechanisms there is usually employed a spring motor as a source of power, and it is customary to provide a winding crank for such motors whereby the springs thereof may be wound from time to time, as necessary in order to produce the energy necessary for driving the record rotating member. Such cranks, however, are not ordinarily provided with any means for preventing the overwinding of the springs of the motor, and it frequently happens in practice that the motor springs are wound too tightly, resulting in injury to the motors and frequently in the breaking of the springs.

Some attempts have been made to incorporate in the motors themselves means for preventing the overwinding of the springs, but such prior devices, so far as I am aware, necessitate the rebuilding of the motor itself when the devices are applied to machines already in use, or to an entire redesign of motors for new machines. Such devices are more or less costly to construct and install, and it is one of the principal objects of the present invention to provide means for preventing the overwinding of spring motors in general, which means may be embodied in a crank or other winding mechanism, and which will be simple in construction, comparatively inexpensive to manufacture and more efficient in use than those which have been heretofore proposed.

With the above and other objects in view which will appear as the description proceeds, the invention consists in the novel details of construction and combinations of parts more fully hereinafter disclosed and particularly pointed out in the appended claims.

Referring to the accompanying drawing forming a part of this specification in which like numerals designate like parts in all the views;

Figure 1 is a side elevational view of a crank made in accordance with the present invention; and, Fig. 2 is a fragmentary view, partly in section, of a portion of the parts shown in Fig. 1.

In the said drawings, the numeral 5 indicates a crank member preferably of metal, provided with the usual rotatable handle 6, with the angularly disposed portion 7, rigid or integral with the body portion 5 of the said crank.

The horizontal portion 7 is preferably enlarged slightly, as indicated in the drawings, and is provided with an axial bore 8, a portion of which is threaded as at 9 to engage the threads 10 upon one end of a rod or shaft 11, as will be clear from the drawings. The other end of the said rod or shaft 11 may be provided with oppositely pitched threads, not shown, or with any other suitable means for readily engaging and disengaging the winding shaft of a spring motor.

In the motors of some phonographs it is customary to provide a motor shaft having a threaded socket provided with right hand threads which are adapted to be engaged by similar threads upon the end of the usual crank member, and in the present construction the rod or shaft 11 may be provided on one end with such right hand threads or it may be provided with one or more pins adapted to engage recesses within the said motor shaft.

It is customary in motors of this type to wind them in a clockwise direction when viewed from the right of Fig. 1, and therefore the threads 10 of the rod or shaft 11 are machined left handed for a purpose which will appear more fully below.

Slidably mounted upon the said rod or shaft is a collar 12, which is adapted to be rigidly secured to the said rod or shaft 11 in any desired position, by means of a set screw 13, or by any other suitable securing means. The bore 8 of the crank member 7 is of sufficient depth to extend beyond the extreme end of the threaded portion 10 of the shaft 11, as clearly illustrated in Fig. 2, and a coiled spring 14 is interposed between the said extreme end of the shaft 11 and the bottom of the said bore, as will be readily apparent. The said spring normally exerts a pressure against the end of the rod or shaft 11 and by adjusting the position of the collar 12 upon the shaft 11 relative to its extreme end, the compression of the said spring 14 within the bore may be controlled for the purpose of varying the frictional engagement of the threads 9 with their companion threads 10, as will appear more fully below.

In use, the rod 11 is connected to the motor shaft by means of its readily detachable connection in the usual manner, and the parts being in the positions illustrated in the drawings, the crank 5 is rotated by means of its handle 6 in the usual and well known manner. The rotation thereof winds up the spring of the motor in the customary manner and as the tension increases it offers more and more resistance to the winding action of the crank with the result that at a predetermined point, the resistance offered by the said motor spring is sufficient to overcome the frictional engagement of the threads 9 and 10, with the result that the rod or shaft 11, and the motor shaft stop rotating while the crank member 5 continues to rotate relative thereto. This relative movement between the parts results in the unscrewing of the crank member from the threaded end 10 of the rod or shaft 11, and if rotary movement of the member 5 is continued it will become disengaged from the said roll 11.

As above indicated, the frictional engagement between the threads 9 and 10 may be controlled by means of the coiled compression spring 14 and the collar 12, since by sliding the collar to the left, as seen in Fig. 2, and securing it, the threaded end 10 of the shaft 11 will project further into the member 8, thereby compressing the spring 14 to a greater extent and causing it to exert a greater pressure upon the end of the shaft 11, with the consequent increase in the frictional resistance between the threads 9 and 10.

In like manner, this resistance may be reduced by positioning the collar 12 closer to the end of the shaft 11 as by moving it toward the right, as seen in Fig. 2. By thus adjusting the pressure exerted by the spring 14 and consequently the frictional engagement of the threads 9 and 10, the device may be adjusted to prevent the overwinding of motor springs of different dimensions and resistances.

It will thus be seen that this invention provides a simple inexpensive and efficient means for preventing the overwinding of spring motor of all types, and one which may be readily employed with motors already in use or which may be provided with equal facility for new motors.

While one form of the invention has been illustrated and described it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A device of the class described comprising means adapted to engage the shaft of a spring motor to rotate the same; means for rotating said first named means; and a threaded frictional connection between said first and second named means adapted to normally transmit motion from said second to said first named means, and to permit relative movement between the two when said first named means meets with a predetermined resistance.

2. A device of the class described comprising means adapted to engage the shaft of a spring motor to rotate the same; means for rotating said first named means; and an adjustable threaded spring controlled frictional connection between said first and second named means adapted to normally transmit motion from said second to said first named means, and to permit relative movement between the two when said first named means meets with a predetermined resistance, whereby said second named means may be dis-connected from said first named means.

3. A device of the class described comprising means adapted to engage the shaft of a spring motor to rotate the same; means for rotating said first named means; an adjustable spring controlled connection between said first and second named means having inter-engaging threaded friction surfaces, adapted to normally transmit motion from said second to said first named means, and to permit relative movement between the two when said first named means meets with a predetermined resistance whereby said second named means may be dis-connected from said first named means; and means whereby the force exerted by said spring may be varied to control the frictional engagement of said connection.

4. A device of the class described comprising means adapted to engage the shaft of a spring motor to rotate the same; means for rotating said first named means; an adjustable spring controlled frictional connection between said first and second named means having co-acting left-hand threaded friction surfaces, adapted to normally transmit motion from said second to said first named means, and to permit relative movement between the two when said first named means meets with a predetermined resistance whereby said second named means may be dis-connected from said first named means and means carried by said first named means, whereby the force exerted by said spring may be varied to control the frictional engagement of said connection.

5. A device of the class described comprising a shaft provided with means whereby it may be readily detachably connected to the winding mechanism of a spring motor, said shaft being also provided with a threaded end; a crank member provided with a threaded socket adapted to frictionally engage the threaded end of said shaft; a spring within said socket engaging the end of said shaft; and a collar adjustably carried by said shaft, adapted to control the penetration of said threaded end into said socket, whereby the force exerted by said spring against said shaft end may be varied.

In testimony whereof I hereunto affix my signature.

THEODORE PHILLIPS.